United States Patent
McGee et al.

[11] Patent Number: 6,070,109
[45] Date of Patent: May 30, 2000

[54] ROBOT CALIBRATION SYSTEM

[75] Inventors: H. Dean McGee; Hadi A. Akeel, both of Rochester Hills; Chi-Keng Tsai; Eric Lee, both of Bloomfield Hills; Min-Ren Jean; Sai-Kai Cheng, both of Rochester Hills, all of Mich.

[73] Assignee: FANUC Robotics North America, Inc., Rochester Hills, Mich.

[21] Appl. No.: 09/037,446

[22] Filed: Mar. 10, 1998

[51] Int. Cl.[7] .......................... G05B 15/00; G05B 19/00
[52] U.S. Cl. .......................... 700/259; 700/57; 700/85; 395/89; 395/94; 395/97
[58] Field of Search ................... 395/89, 97, 94; 700/57, 85, 259

[56] References Cited

U.S. PATENT DOCUMENTS

| | | | |
|---|---|---|---|
| 4,362,977 | 12/1982 | Evans et al. ................. | 395/89 |
| 4,537,858 | 8/1985 | O'Sullivan et al. ........... | 435/119 |
| 4,642,781 | 2/1987 | Szonyi ........................ | 395/89 |
| 4,763,276 | 8/1988 | Perreirra et al. ............. | 395/97 |
| 4,831,549 | 5/1989 | Rad et al. ................... | 395/89 |
| 5,177,563 | 1/1993 | Everett et al. .............. | 356/375 |
| 5,297,238 | 3/1994 | Wang et al. ................. | 395/94 |
| 5,373,221 | 12/1994 | McGee et al. .............. | 318/568.09 |
| 5,392,384 | 2/1995 | Tounai et al. .............. | 395/89 |
| 5,434,489 | 7/1995 | Cheng et al. .............. | 318/568.15 |
| 5,495,410 | 2/1996 | Graf ........................... | 364/191 |
| 5,528,116 | 6/1996 | Snell .......................... | 318/568.13 |
| 5,535,306 | 7/1996 | Stevens ..................... | 395/89 |
| 5,751,610 | 5/1998 | Gan et al. ................... | 1/1 |
| 5,880,956 | 3/1999 | Graf ............................ | 364/191 |

OTHER PUBLICATIONS

"Identifying Robot Parameters Using Partial Pose Information"; IEEE Control Systems (pp. 6–14).
"Using Passive End–Point Motion Constraints To Calibrate Robot Manipulators"; Transactions of the ASME; 560/vol. 115, Sep. 1993

*Primary Examiner*—Paul P. Gordon
*Assistant Examiner*—M. Marc
*Attorney, Agent, or Firm*—Howard & Howard

[57] ABSTRACT

A robot calibration system includes a calibration sensor that provides an indication of when a first reference point that remains fixed relative to a robot base is a fixed distance from a second reference point that is located on the robot arm. The robot arm is moved through a plurality of orientations and each time that the fixed distance between the two reference points is achieved, robot joint position information is determined. The preferred calibration sensor includes a string that extends between the two reference points and activates a signal generator each time that the string is taut as caused by the orientation of the robot arm. The generated signal indicates that the two reference points are separated by the fixed distance. The determined robot joint positions are then used to determine a calibration factor which varies depending on the needs of a particular situation. Example calibration factors are useful for correcting errors in robot kinematic information, locating the workcell reference frame and locating the tool center point reference frame.

31 Claims, 3 Drawing Sheets

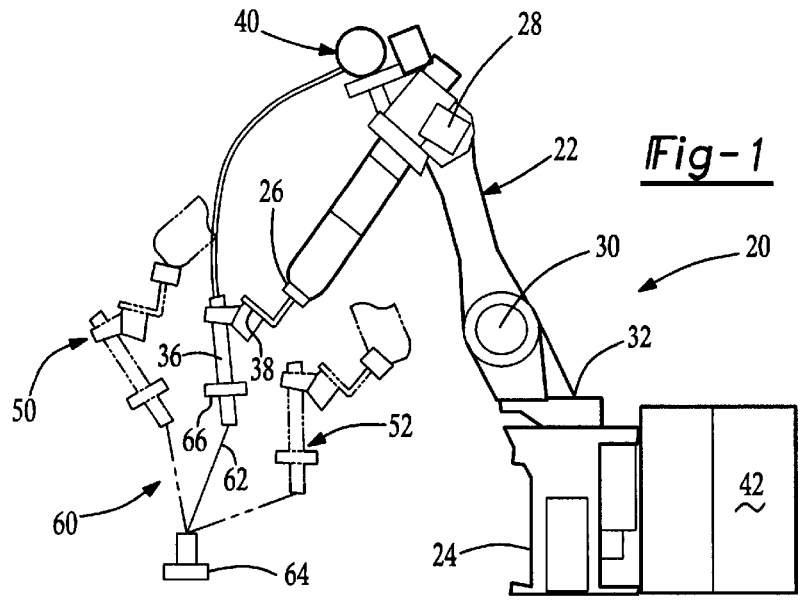
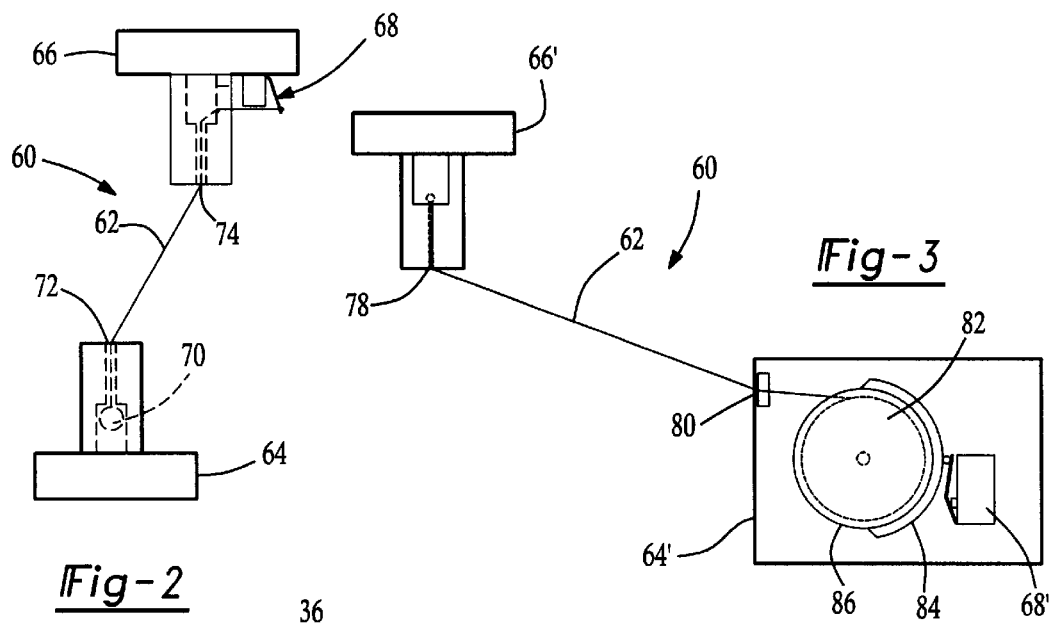
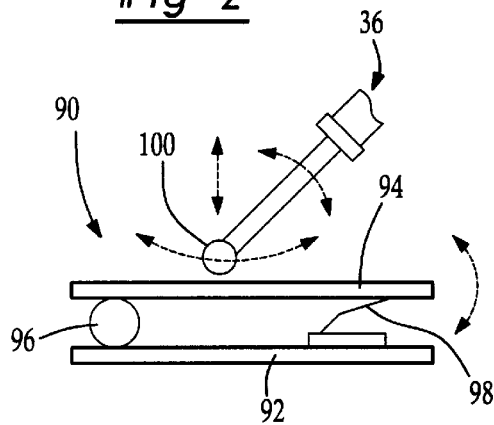
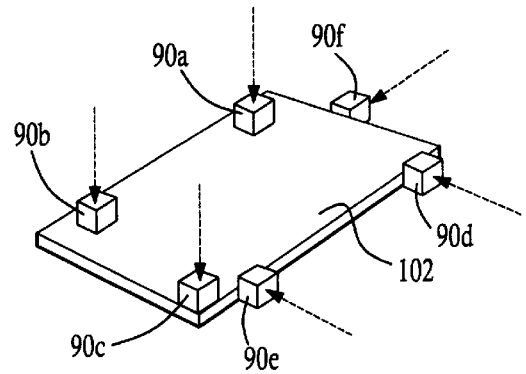

ROBOT CALIBRATION SYSTEM

BACKGROUND OF THE INVENTION

This invention generally relates to a method and device for calibrating a robot and more particularly to a device that provides calibration of robot kinematics, tool center point and workcell reference frames.

Accuracy is an important consideration in all robot systems. Robot inaccuracies are generally placed into one of two categories; geometric and non-geometric. Kinematic parameter errors such as variations in link lengths and reference joint angles and misalignments of reference frames such as the tool center point reference frame and the workcell reference frame are considered geometric errors. Non-geometric errors include compliance in gear trains, backlash and other similar phenomena encountered in typical systems.

A variety of attempts to improve robot accuracy have been made. Currently used techniques, however, are typically tedious, time-consuming, undesirably expensive and often do not provide an acceptable level of accuracy. Further, conventional techniques tend to address only one specific potential robot inaccuracy, which increases overall cost when a number of potential causes of error have to be addressed. For example, conventional techniques require one system for correcting the kinematic parameter errors while a second approach is necessary to determine the workcell reference frame location.

One example proposed solution is discussed in a technical paper authored by Morris R. Driels and William E. Swayze, entitled "Automated Partial Pose Measurement System For Manipulator Calibration Experiments," which was published in *IEEE Transactions On Robotics and Automation*, Volume 10, No. 4, August 1994. That document discloses a system where a wire potentiometer is attached to a robot tool using two specially designed fixtures. That arrangement is intended to measure a distance indicated by the wire potentiometer. Although that method is considered an improvement on other prior art, it is not without drawbacks. First, relatively expensive equipment (including the wire potentiometer) is required. That equipment must be properly calibrated or it will introduce errors into the overall calibration process. Further, additional hardware and software are required to convert information obtained through the wire potentiometer to a form that is useful in calibrating a robot. Further, there is the possibility of a constant error introduced by the components used for the measuring process that may not be detectable and will result in a corresponding calibration error.

A further shortcoming of all proposed systems is that none of them are capable of simultaneously resolving all of the key robot calibration issues. For example, none of the prior art corrects for kinematic errors that are position dependent and vary in real time with robot motion. Further, all of them suffer from one or more of the drawbacks mentioned above. A significant problem with conventional or proposed systems has been that the calibration devices themselves often need to be re-calibrated or serviced. This introduces additional expense and another level of potential error in robot calibration.

Robot accuracy is becoming increasingly important for two basic reasons. First, it is highly desirable to duplicate robot workcells that will perform identically. Second, data-driven applications that are generated off-line from the robot system are gaining increased acceptance in the industry. These off-line generated programs require that the robot geometry and performance correspond as close as possible to the ideal model that is used when developing the off-line program. Successfully duplicating robot workcells and utilizing off-line generated programs require that all robot-related inaccuracies be minimized.

This invention provides an economical, robust calibration system that overcomes the shortcomings and drawbacks of prior attempts and has the ability to calibrate the major considerations involved in any robot system including calibration on a real-time basis during robot motion.

SUMMARY OF THE INVENTION

In general terms, this invention is a robot calibration system that includes a robot base and a robot arm supported on the base. The robot arm includes a plurality of joints that are moveable into plurality of joint positions to provide a plurality of robot arm orientations. A controller controls movement of the robot joints to move the robot arm among the various orientations. The controller determines each joint position for each of the robot arm joints for the various robot arm orientations. A calibration member, such as a string, has two ends. A first end is located near a first reference location that remains fixed relative to the robot base. The second end of the calibration member is near a second reference location on a selected portion of the robot arm. Whenever the robot arm is in an orientation that causes the calibration member to be taut, that activates a signal generator, which generates an electrical signal that is communicated to the controller. The controller determines the joint positions for each of the robot arm joints responsive to receiving the electrical signal. The controller then uses the recorded joint positions in the various orientations where the calibration member is taut and then uses those joint positions to solve for or determine a calibration factor.

The method of this invention includes several basic steps. A first reference location is established that remains fixed relative to the robot base. A second reference location is established on the robot arm. The robot arm is then moved into a plurality of orientations where at least one of the robot joints is in a position that is different from the position of that joint in a previous orientation. Whenever the second reference location is moved to a fixed distance from the first reference location, which occurs as the robot arm is moved through the various orientations, each joint position of the robot arm is determined. The various joint positions are then used to determine a calibration factor.

The calibration factor of this invention can be used for various purposes. Example calibration factors include an error correction factor that is used to correct inaccuracies in robot default joint positions. The preferred embodiment includes using the calibration factor to correct robot kinematic parameter errors such as variations in reference joint angles as compared to real-world joint positions. The calibration factor can also be utilized to accurately determine the location of a tool center point reference frame or a workcell reference frame. In the latter two examples, the calibration factor can be the real world or Cartesian location of the reference frame relative to the robot. The calibration factor determined by this method can be a function of joint positions, which allows the robot positions to be corrected in real time during robot motion.

The various features and advantages of this invention will become apparent to those skilled in the art from the following detailed description of the currently preferred embodiment. The drawings that accompanying the detailed description can be briefly described as follows.

BRIEF DESCRIPTION OF THE DRAWINGS

FIG. 1 is a diagrammatic illustration of a robot calibration system designed according to this invention.

FIG. 2 is a diagrammatic illustration of a preferred embodiment of a calibration sensor designed according to this invention.

FIG. 3 is a diagrammatic illustration of a modification of the embodiment of FIG. 2.

FIG. 4 is a diagrammatic illustration of another calibration sensor designed according to this invention.

FIG. 5 is a schematic illustration of an arrangement for locating a reference frame relative to a robot.

DETAILED DESCRIPTION OF THE PREFERRED EMBODIMENT

Figure 6:
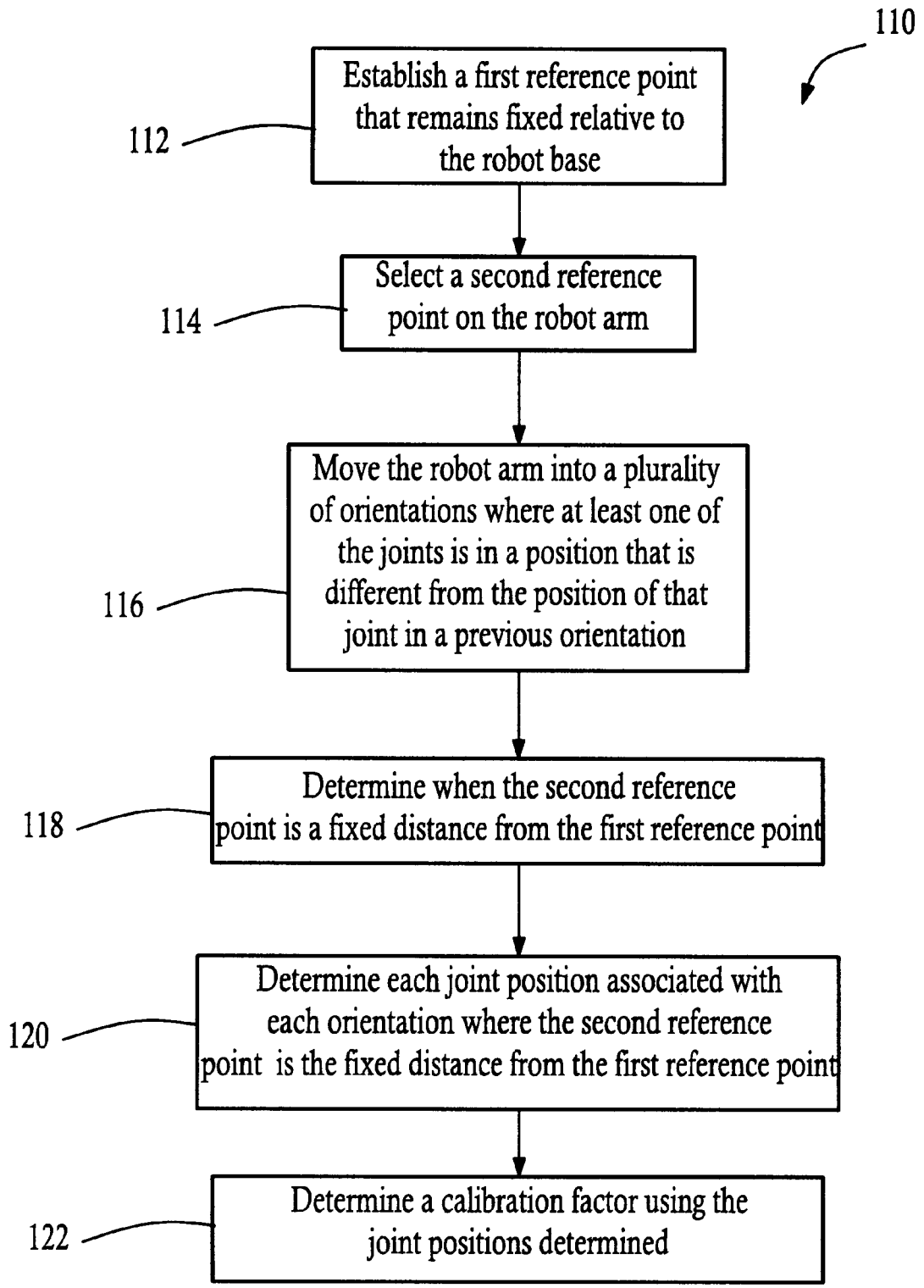
FIG. 6 is a flow chart diagram summarizing the method of this invention.

FIG. 1 diagrammatically illustrates a robot 20 including a robot arm 22 that is supported on a robot base 24. The robot arm 22 includes a plurality of joints 26, 28, 30 and 32 that connect the various links that make up the robot arm 22. The joints are moveable into a variety of joint positions to achieve various orientations of the robot arm 22.

A tool 36 is supported on a face plate 38 of the robot arm 22. A conventional tool controller 40 is illustrated, which includes supply lines for air, coolant and electricity, for example.

A controller 42 (schematically illustrated) controls the movement of the various robot arm joints 26–32. The controller also monitors the position of each joint as it is moved into a new position. This is accomplished through conventional sensors on the joints or internally within the controller 42 by appropriate software, for example. The controller 42 moves the robot arm 22 into a variety of orientations such as illustrated in phantom at 50 and 52 in a conventional manner.

A calibration sensor 60 includes a calibration member 62 that extends between a calibration base 64 and an attachment member 66. The calibration member 62 preferably is made from a single piece of string. "String" as used in this specification refers to any cable, chord, tether or wire that is of a relatively small dimension. The term "string" is meant generically and should not be limited, for example, to a cloth thread.

The calibration base 64 preferably is placed in a position relative to the robot base 24 where it will remain throughout the calibration process. The calibration base 64 provides a first reference location relative to the robot base 24. While the location of the calibration base 64 need not be known initially, the determination of a calibration factor can be simplified by placing the calibration base 64 at the robot base 24, for example.

The attachment member 66 is attached to a selected portion of the robot arm 22. The preferred location for the attachment member 66 is at the tool center point. By placing the attachment member 66 at the tool center point, the calibration of the tool center point reference frame becomes possible without requiring additional transformations between the tool center point and a location of the attachment member 66. Attachment member 66 provides a second reference location on the robot arm 22. In an embodiment where no tool 36 is attached to the robot arm 22, the attachment member 66 can be placed on the face plate 38, for example.

FIG. 2 illustrates the calibration sensor 60 in more detail. The attachment member 66 preferably includes a switch 68 that generates an electrical signal when activated. One terminal end of the calibration member 62 is coupled with the switch 68 so that the switch 68 is activated whenever the calibration member is taut as caused by movement of the robot arm 22. The opposite end of the calibration member 62 is fixed within the calibration base 64 by a conventional fastening member 70.

The calibration member 62 extends through an orifice 72 on the calibration base 64 and an orifice 74 on the attachment member 66. The size of the openings 72 and 74 preferably are slightly greater than the outside diameter of the calibration member 62. Such an arrangement provides tor effectively defining a point at the interface between the calibration member 62 and the calibration base 64 and attachment member 66, respectively. A single reference point associated with the calibration base 64 and another reference point associated with the attachment member 66 ensures that the reference points will remain along the line defined by the taut calibration member 62. In the preferred embodiment, whenever the calibration member 62 is taut, there is a single point at each end of the calibration member 62 that will naturally become the workcell reference point and the tooling reference point, which can be used as the origin of the workcell and the tool center point reference frames, respectively. More particularly, the appreciably constant position of the opening 74 provides an interface between the calibration member 62 and the opening 74 that is the first reference point. Similarly, the interface between the opening 72 and the calibration member 62 becomes the second reference point. Those skilled in the art will appreciate the nature of the exact placement of the reference points as a result of the slight radius of curvature in the string 62 at the interface with the openings 72 and 74 in some robot orientations. The distance between the reference points at the interface between the calibration member 62 and the openings 72 and 74 preferably is a fixed distance. In other words, the length of the calibration member 62 preferably is always the same when the switch 68 is activated as caused by movement of the robot arm 22 into a variety of orientations.

Since the calibration base 64 remains in a fixed position relative to the robot base 24, the switch 68 will generate an electrical signal each time that the second reference location is the fixed distance (provided by the calibration member 62) from the first reference location. Therefore, whenever the controller 42 receives a signal from the switch 68, the second reference point is located on a sphere having the first reference location as its origin and a radius equal to the length of the calibration member 62. Importantly, the length of the calibration member need not be known. In one example (see FIG. 3) the length of the calibration member changes by known increments as the robot 20 moves through a variety of orientations.

The electrical signal generated by the switch 68 preferably is communicated directly to the controller 42. The electrical signal can be any standard digital input signal provided that the controller 42 is capable of recognizing it. The electrical signal provides an indication to the robot controller that the second reference point is at the fixed distance from the first reference point. Preferably, the controller 42 stops motion of the robot arm upon receiving the signal from the switch 68. The controller 42 then preferably determines the joint position of each joint on the robot arm 22 while the robot arm is in that orientation where the calibration member 62 is taut (i.e., when the second reference point is the fixed distance away from the first reference point). Alternatively, the controller may move the robot at slow speed, a few mm/minute, in the vicinity of the switch trigger point, as it pulls the string 62 away from the base 64, when the switch signal is received, the controller instantaneously samples and records all robot joint values representative of the location of the second reference point at the fixed distance.

Further details regarding the method of this invention will be provided below after two alternative calibration sensor embodiments are described.

FIG. 3 illustrates an alternative embodiment of the calibration sensor 60. In this embodiment, the switch 68' is supported on the calibration base 64'. The attachment member 66' includes the fixed end of the calibration member 62. An opening 78 on the attachment member 66' provides the second, moveable reference point. An opening 80 on the calibration base 64' provides the first reference point that remains fixable relative to the robot base 24.

The embodiment of FIG. 3 includes a spring-biased rotary reel 82. The reel 82 preferably is spring biased so that the calibration member 62 is constantly under tension, which provides the advantage of avoiding obstructions that may become entangled with the calibration member 62 in a particular workcell. The reel 82 includes an outer surface having a first outer diameter 84 that is greater than a second outer diameter 86. The switch 68' is activated whenever the switch contact encounters an interface between the first outer diameter 84 and the second outer diameter 86. In this general manner, the switch 68' provides the electrical signal that tells the controller 42 to measure the joint positions. In another embodiment a second switch similar to 68' is included to provide a plurality of signals for each rotation of the reel, which would provide not only distance information between the first and second reference points but also would provide information regarding the direction of travel of the robot arm 22 between orientations. Given the size of the reel 82, the controller 42 can determine the distance between the first and second reference points as being incremented with each rotation of the reel 82, which causes activation of the switch 68'. The embodiment of FIG. 3 preferably generates an electrical signal that is communicated to the controller 42 identical to that described above but provides the further advantage of being able to determine direction of travel of the robot arm 22 between signals and provides a means for detection of multiple points that differ by a known distance to the fixed first reference location. The switch 68 may be any type of switch that can be triggered at a fixed point on the periphery of reel 82 such as a Hall effect switch, inductive, or capacitive proximity pickups, etc.

FIG. 4 illustrates another embodiment of a calibration sensor 90. In this embodiment, a base portion 92 and a contact portion 94 are interconnected by a spring member 96. The contact portion 94 preferably is spring biased into a position where it does not contact a switch 98. The robot arm 22 is moved through a plurality of orientations by the controller 42. A terminal reference point 100 on the robot arm 22 contacts the contact surface 94, which activates the switch 98. Switch 98 provides the signal to the controller 42 to determine the joint positions in the orientation when the switch 98 is activated. In this embodiment, the fixed distance between the first reference location, which is provided by the contact surface 94, and the second reference location, which is provided by the terminal end 100 of the robot arm 22, is zero. In the case of sphere 100, the distance is the radius of the sphere 100, which can be zero for a pointed terminal end. The robot arm 22 can obviously be in a variety of orientations where the distance between the terminal end 100 and the contactor surface 94 is zero.

FIG. 5 diagrammatically illustrates an implementation of the sensor 90 shown in FIG. 4. By placing a plurality of sensors 90 on a plane in the configuration as illustrated, the definition and location of the plane 102 relative to the robot base 24 can be determined. The fixture is representative of appurtenances common to a workcell environment, known as the 3-2-1 principal, and can be provided by any locating surfaces meeting the requirements of: three of the sensors share a common first plane, two of the sensors share a common second plane orthogonal to the first plane, and the remaining sensor is oriented to contain a third plane orthogonal to the first and second plane. The calibration uses the single x,y,z Cartesian component information corresponding to the sensing plane. For instance if the first plane is defined to correspond to the workcell z=zero value and include all values of x and y, then any time the one of the corresponding switches 90a, 90b or 90c is contacted, the z coordinate is known to be zero. Similarly, if the second plane is defined to correspond to the workcell y=zero value and include all values of x and z, then any time one of the corresponding switches 90d or 90e is contacted, the y coordinate is known to be zero. Similarly, if the third plane is defined to correspond to the workcell x=zero value and all values of y and z, then any time the corresponding switch 90f is contacted, the x coordinate is known to be zero.

As long as the frame defined by the plurality of switches 90, with one plane containing at least three sensors, one plane containing at least two sensors, and one plane containing at least one sensor, bears a known relationship to the workcell frame, then the workcell frame can be calibrated simultaneously (or also independently) with the TCP and robot. In this manner, the sensors can be placed anywhere on the corresponding plane defined by common workcell fixturing such as a fixture base. If the surface of the fixture plane is known and meets the orthogonality requirements (described above), then the sensor can be simply placed (either magnetically or by other means) anywhere on that surface such that the robot can have access for the calibration process, and does not require precision placement in the two dimensions which contain the plane.

Manipulating the robot arm 22 to cause the terminal end 100 to approach each of the sensors 90 as illustrated by the arrows in FIG. 5 provides enough information to locate the plane 102 relative to the robot base 24.

The method of calibration associated with this invention is performed by determining the joint positions of the robot arm 22 in a plurality of orientations where the first reference point and the second reference point are separated by a fixed distance. Using the embodiment of FIGS. 1 and 2 as an example, the method of this invention preferably is performed in the following general manner.

The first reference location is fixed relative to the robot base 24 by placing the calibration base 64 in a desired location. The calibration base may simply be placed on a flat surface within the robot workcell, for example. Importantly, the location of the calibration base 64 does not necessarily need to be known relative to the robot base 24. When the robot arm 22 is in a default or initial position, the attachment member 66 is placed onto the desired position, such as the tool center point, on the robot arm 22. The exact location of the attachment member 66 can be varied to make different determinations. The attachment member can be mounted to the chosen location in any convenient manner (i.e., magnetically). provided that it does not move during calibration.

The default or initial position of the robot arm 22 has joint positions or joint angles associated with it. The controller 42 has stored values for the default or initial joint positions. The term "default" is used in this specification to refer to the joint positions dictated by the robot manufacturer, which are often referred to as the factory supplied zero position angles.

The controller 42 then moves the robot arm 22 into a plurality of orientations. Each time that the second reference location is moved the fixed distance from the first reference location, the switch 68 generates an electrical signal that is communicated to the controller 42. Preferably, the controller 42 stops movement of the robot arm 22 and determines the joint position of each joint from that orientation. Importantly, each joint must be moved into a different position in at least one of the orientations compared to the other orientations. In other words, each joint 26, 28, 30 and 32 is moved into at least two different positions for the various orientations of the robot arm 22 that activates the switch 68.

The preferred implementation of the method includes moving the robot arm 22 among the various orientations where a signal is generated by the calibration sensor 60 (or 90 depending on the embodiment). The robot arm 22 preferably moves from a starting position at a moderate speed, slows down as it approaches the expected location of the reference point at the fixed distance and stops upon the controller 32 receiving a signal from the calibration sensor. The robot arm 22 preferably then moves toward the starting position at a slow speed until the switch releases (i.e., a cancelling of the electrical signal occurs). The robot then moves toward the first trigger position at a slow speed until the switch of the calibration sensor is again triggered to generate the electrical signal. At this point, the robot arm stops and the controller 42 determines the joint angles or the Cartesian position, depending on the calibration factor that is desired. These steps are then repeated for all of the calibration points. The position information from each orientation is then utilized in the calibration function to calculate the calibration factor. If adequate resolution is achieved, the position that the first detection of the electrical signal is sufficient and additional backward and/or slow motion may not be required. It should be noted, that although the illustrated embodiments include a switch (such as 68 or 98) a hall effect or a proximity sensor is within the scope of this invention.

The subject of the calibration dictates the number of joint positions that are determined by the controller 42. For example, when the robot kinematic parameters are being calibrated, the number of joints in the robot arm 22 provides the number of variables that must be determined. Therefore, joint position information is required for a number of orientations that at least equals the number of variables (in this case, robot arm joints). In the preferred embodiment, joint positions are determined at twice as many orientations as there are variables to be determined.

Once the controller has determined the joint positions at the necessary number of orientations, it can then determine the calibration factors. The determination is based upon the joint positions and the fact that a fixed distance exists (or in at least one example, several distances with known increments) between the first and second reference locations for each orientation. The preferred method utilizes a least-squares method to solve for the unknown kinematic and workcell parameters. In one embodiment, the conventional Newton-Raphson method is used to solve a system of equations that describe the kinematic or workcell parameters. Any well-known solution technique can be implemented through appropriately designed software that is included in the controller 42. Given this specification, those skilled in the art will be able to choose from among the various solution methods and would be able to develop appropriate software to implement it. Example solution methods are found in the Driels paper mentioned above and R. Bernhardt, Robot Calibration, pp. 157–195, Chapman & Hall, London, U.K. (1993).

The preferred embodiment includes determining critical errors in the initial or default joint positions. Any such error should be minimized. The calibration factor determined according to this invention is used to compensate for any such error. Such compensation can be applied to the set of joint positions at incremental time intervals that correspond to the position command updates provided by the robot controller. This feature provides real time error correction.

The preferred implementation results in a scalar equation that indicates the location vector component, p, of the homogeneous transform P. An example equation is $e^2=(p^Tp-r^2)^2$;

where e is the error to be minimized, r is the radius of the sphere described by the taut calibration member 62, and p is the Cartesian vector between the first reference point and the second reference point.

Figure 7:
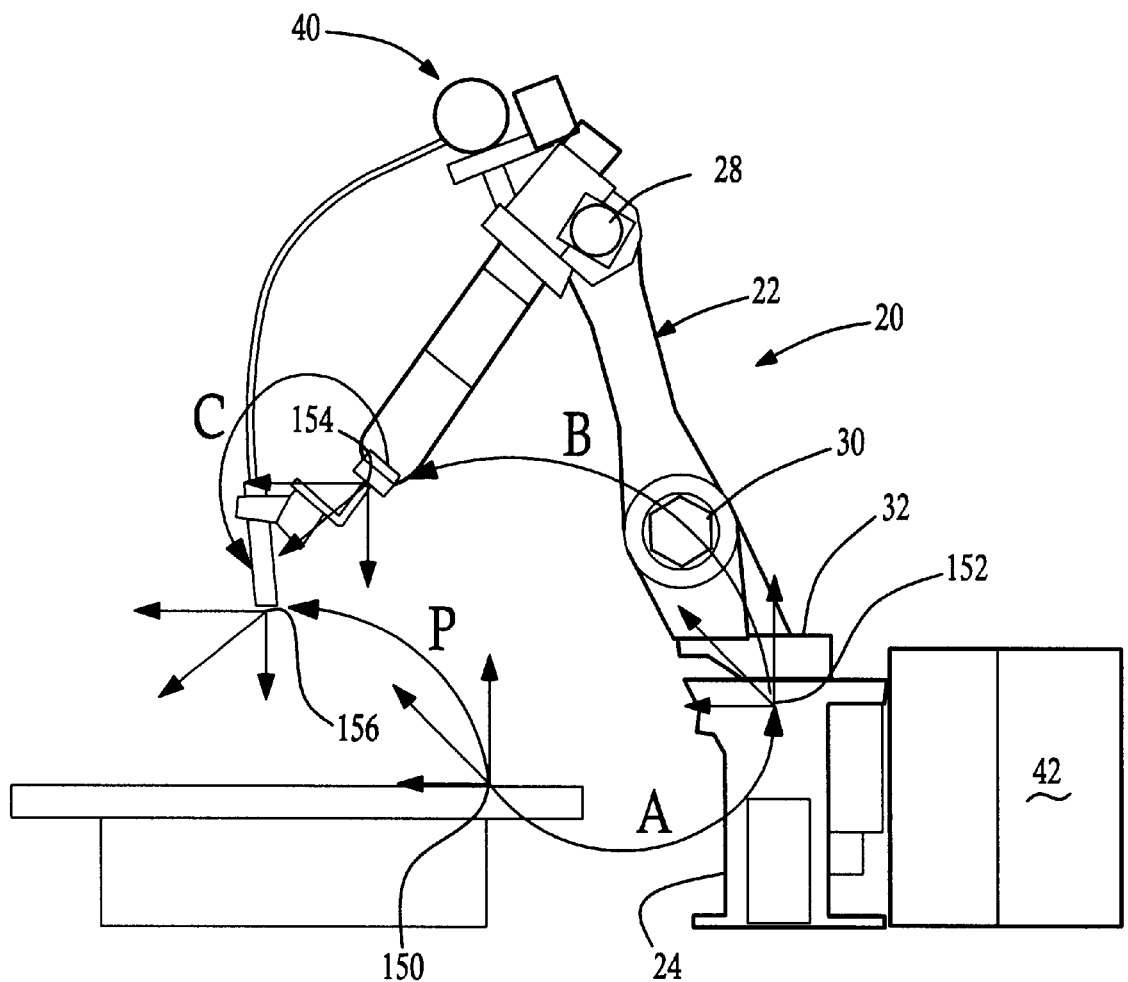
FIG. 7 is a digrammatic illustration of the frame relationships of the robot base, face plate, tool, center point and workcell frames.

Referring to FIG. 7, the equation for P preferably is written as: P=ABC. A is the homogeneous transform from the origin of the workcell frame 150 (i.e., the first reference point) to the robot base frame 152. B is the homogeneous transform from the robot base frame 152 to the robot face plate 38 reference frame 154. C is the homogeneous transform from the face plate reference frame 154 to the origin of the tool frame 156 (i.e., the second reference point, which preferably is the tool center point). As can be appreciated from the drawing, P is the homogeneous transform from the workcell frame 150 to the tool reference frame 156. Given this specification, those skilled in the art will be able to implement appropriate software to make the calculations needed to determine the calibration factor for a particular implementation of this invention.

The method of this invention is summarized in flow chart diagram form in FIG. 6 where the flow chart 110 shows the preferred implementation of the basic steps of the method. Step 112 is accomplished by placing the calibration base 64 in a fixed location relative to the robot base 24. Step 114 is accomplished by placing the attachment member 66 on a desired point of the robot arm 22. Step 116 is accomplished by the controller 42 moving the robot arm 22 through a plurality of orientations. Step 118 is performed each time that the first reference point and the second reference point are separated by the fixed distance as caused by movement of the robot arm 22 among the various orientations. Step 120 is performed by the controller 42 responsive to receiving the electrical signal from the switch 68, for example. Step 122 is performed by the controller 42 to determine critical errors in the default joint positions, the location of the workcell or the location of the tool center reference frame.

In a situation where it is desirable to calibrate all three possible solutions (i.e., robot parameters, workcell and tool center) three different first fixed reference points should be used with a plurality of joint position measurements being taken with regard to each of the first reference points, respectively.

In a situation where it is desirable to calibrate the workcell coordinate frame using sensor 60, three different first fixed reference points should be used with a plurality of joint position measurements being taken with regard to each of the first reference points, respectively. For this case, these three different points must provide sufficient information to fully define the workcell reference frame (i.e., the six degrees of freedom that minimally define a frame must be provided by these three points). If the entire workcell coordinate (x,y,z) of each point is known for a total of nine values, then the extra information above the six values required for defining the frame will be used to further minimize the total calibration error. Typically, one point is chosen as the workcell origin (x,y,z values identically zero, or alternatively, with a known shift from the workcell origin). A second point is chosen to lie along the x axis (y and z coordinates identically zero). The third point is chosen to lie in the x-y plane (z coordinate is zero). For this case, the unknown components of the coordinates will be determined as additional calibration parameters.

In the situation where it is desirable to calibrate two or more identical workcells, the three different first reference points should be identically located or located in a known offset in each of the identical workcells. For such a case, with each robot fully calibrated relative to its workcell frame and its TCP, a path transcribed by the TCP relative to the workcell frame in one cell has a substantially identical relationship in the second workcell. The paths and programs from one robot can then be transferred from one robot to another with minimal trajectory deviation during program execution.

As can be seen, this invention provides a solution that easily integrates solving the total robot calibration problem. The method of this invention simply requires the detection of a reference point being a fixed distance from a second reference point, line or plane and does not require measurements of exact distance or prior knowledge of dimensional relationships between the sensing features of points, lines or planes.

This invention is useful for providing real time error correction during robot movement. For example, when a robot moves between an initial position and a destination position, there are a plurality of orientations along the path between those positions. The calibration factor determined by this invention is useful to correct robot orientations throughout the movement from the initial position to the destination position on a real time basis. This dynamic calibration capability is implemented by the controller during robot movement. The controller preferably dynamically applies the calibration factor to the robot joint positions on an incremental basis.

The inventive dynamic calibration method of this invention preferably includes determining the calibration factor as described above. The robot preferably begins in the default position dictated by the default joint positions. The calibration factor is then applied to the default joint positions to obtain initial joint positions, thereby placing the robot into an initial orientation. A set of time-based increments of joint positions are determined based upon the desired movement of the robot between the initial orientation and the destination orientation. Each incremental orientation has a set of associated joint positions. The controller preferably applies the calibration factor to each incremental set of joint positions so that the joint positions are corrected in accordance with the calibration determinations made using this invention.

The dynamic calibration that becomes possible using this invention preferably is carried out by the controller throughout robot movement but can also be used only for accurately moving the robot into selected orientations along the path between the initial orientation and the destination orientation. Given this specification, those skilled in the art will be able to realize the necessary software to program a controller to carry out the dynamic calibration according to the needs of a particular situation.

Similar to the method described by sensor 90, other sensors that detect location on a line, such as a laser beam, can be used to implement the robot calibration method of this invention. For this case, the line can provide up to two variables (the Cartesian72 components that define the line where x and y equal zero for the line along the z axis) toward the calibration solution. If the line is known only to be contained in a plane, then the contribution is only one variable similar to a plane sensor such as sensor 90.

The key to these methods is the detection of a series of positions constrained by a fixed quantity without the requirement of known physical dimensions. The fixed quantity can be the distance as determined to a point as provided by sensor 60, the distance as determined to a plane as provided by sensor 90, or the distance as determined to a line which could be provided by photodetector based sensors, for instance.

The fixed distance between the reference points may or may not be known. The fixed distance may be zero. All previous calibration methods overlook the simple and low cost solution that this invention provides by detecting relative distances without measurement. This invention provides a number of advantages over prior art attempts.

The first major advantage of this invention is that it is very economical. The hardware costs associated with this invention are insignificant compared to traditional calibration systems. Moreover, the more expensive devices or prior calibration systems are unnecessarily complex and can require frequent maintenance. The hardware required to implement of this invention is very inexpensive and, therefore, readily duplicated so that a separate calibration sensor could be provided for multiple robot workcells in any location. Further, the hardware associated with an implementation of this invention is robust and not subject to the maintenance and repair that is needed with prior systems.

The second major advantage of this invention is that it accomplishes desired results in a relatively easy fashion. Conventional calibration systems require substantial setup and arrangement of the calibration equipment. This invention requires no external power sources, a simple input output connection for a direct interface between the controller 42 and the calibration sensor and readily available hardware.

A third major advantage of this invention is that it provides a total system solution. This invention provides the ability to simultaneously calibrate tool center point, workcell reference frame and robot geometric and non-geometric parameters. All previous calibration systems, at best, addressed only two of those three issues within a single calibration process. This invention addresses all three and minimizes the chance of errors in calibration.

Another significant advantage of this invention is that it can address any calibration need independent of others. For example, if tooling is damaged or changed, the tool center point must be recalibrated. This invention allows one to recalibrate the tool center point without having to recalibrate the robot kinematics or the workcell reference frame. Similarly, the workcell need not be redefined if only the robot needs to be recalibrated because of a motor replacement, for example. This invention can be used to calibrate (or recalibrate) only the joint affected by such a component replacement. Moreover, there is no need to recalibrate the entire robot in such situations.

Yet another advantage of this invention is the accuracy that it provides. This invention has very few moving parts and the calibration sensor need not be calibrated. The accuracy of a system designed according to this invention is limited only by the repeatability of the robot, the stability of the calibration mounting surfaces and the specification of components used in the calibration hardware design.

The relatively simple design of an embodiment of this invention allows the hardware to be designed at an essentially insignificant cost compared to a typical robot system. Further, the required hardware components are relatively small and can be carried about in an individual's hands and require no external computers or other support devices. This is significantly different than many conventional calibration systems that require large and bulky sensor devices.

Still further, the hardware components of this invention are not subject to damage or faulty operation caused by the environment in which many industrial robots operate. Replacing components of this invention in the field is relatively simple, especially when compared to conventional calibration systems. The accuracy of the calibration depends on the repeatability of triggering the switch rather than on the absolute accuracy of the system components as in the prior art.

The fact that a simple interface between the calibration sensor and the robot controller is provided through a single input/output connection provides yet another advantage. There is no requirement for a special power source, power interface, serial communication or other additional display devices or external computers. Moreover, the overall simplicity of the design of this invention enables one to quickly implement it with minimal difficulty and minimal setup time. Further, the system of this invention can be implemented in almost any workcell environment.

The preceding description is exemplary rather than limiting in nature. Variations and modifications to the disclosed embodiment may become apparent to those skilled in the art that do not necessarily depart from the purview and spirit of this invention. For example, the preferred embodiment includes stopping the robot whenever the calibration member is taut but it could be possible to utilize slow, continuous robot motion throughout calibration. Accordingly, the scope of legal protection given to this invention can only be determined by studying the following claims.

We claim:

1. A method of calibrating a robot system having a robot arm that is supported on a base and includes a plurality of joints that have a set of default positions and are moveable into a plurality of joint positions to provide a plurality of robot arm orientations, comprising the steps of:
   (A) establishing a first reference location that remains fixed relative to the robot base;
   (B) establishing a second reference location on the robot arm;
   (C) automatically moving the robot arm into a plurality of orientations where at least one of the joints is in a position that is different from the position of the one joint in a previous orientation;
   (D) determining when the second reference location is at least one fixed distance from the first reference location;
   (E) determining each joint position associated with each orientation where the second reference location is the fixed distance from the first reference location; and
   (F) determining a calibration factor by comparing the default positions with the joint positions from step (E).

2. The method of claim 1, wherein step (F) is performed by determining a known number of variables that corresponds to the plurality of joints and wherein steps (D) and (E) are performed at least the known number of times.

3. The method of claim 1, wherein step (F) is performed by determining the calibration factor as one of a robot parameter calibration factor, a workcell reference frame calibration factor and a tool reference frame calibration factor.

4. The method of claim 1, wherein step (F) is performed by simultaneously determining a robot parameter calibration factor, a workcell reference frame calibration factor and a tool reference frame calibration factor.

5. The method of claim 1, further comprising the step of providing a calibration member having a first end, a second end and a length that is equal to the fixed distance of step (D), and wherein step (A) is performed by positioning the first end of the calibration member at the fixed location of the first reference location and step (B) is performed by positioning the second end on the robot arm at the location of the second reference location.

6. The method of claim 1, wherein step (D) includes predetermining the fixed distance.

7. The method of claim 1, wherein the fixed distance of step (D) is zero.

8. The method of claim 1 including using the calibration factor to correct for errors in the default positions.

9. A method of dynamically calibrating a robot that is moved along a path between an initial orientation and a destination orientation where the robot orientation is dictated by robot joint positions, comprising the steps of:
   (A) determining a calibration factor using joint position information from a plurality of robot orientations;
   (B) moving the robot joints into default positions;
   (C) moving the robot into the initial orientation by applying the calibration factor to the default positions;
   (D) determining a next desired robot orientation having a plurality of joint positions;
   (E) determining a target robot orientation by applying the calibration factor to the joint positions of the next desired robot orientation;
   (F) moving the robot into the target robot orientation; and
   (G) repeating steps (D) through (F) until the robot is moved into the destination orientation.

10. The method of claim 9, including using the calibration factor to correct for errors in the default positions.

11. A robot calibration system, comprising:
   a robot base;
   a robot arm supported on said base and including a plurality of joints that are moveable into a plurality of joint positions to provide a plurality of orientations of said robot arm;
   a signal generator that generates an electrical signal;
   a controller that controls movement of said joints to move said robot arm among said plurality of orientations, said controller determining each said joint position for each orientation of said robot arm responsive to said signal; and
   a calibration member having a calibration length, a first end near a first reference location that remains fixed relative to said robot base and a second end near a second reference location on said robot arm, said calibration member being taut and activating said signal generator whenever said robot arm is moved into one of said robot arm orientations where a distance between said second reference location and said first reference location equals said calibration length.

12. The system of claim 11, wherein said calibration member comprises a string.

13. The system of claim 12, further comprising an attachment member that is adapted to be attached to a selected location on said robot arm, said attachment member supporting said second end of said string, said second reference location being defined at an interface between said string and said attachment member.

14. The system of claim 13, wherein said string has an outside dimension and wherein said interface includes an opening that is approximately equal to said string outside dimension.

15. The system of claim 13, further comprising a calibration base that supports said first end of said string, said first reference location being defined at an interface between said string and said calibration base.

16. The system of claim 15, wherein said string has an outside dimension and said interface includes an opening that is approximately equal to said string outside dimension.

17. The system of claim 16, wherein a portion of said string moves relative to said opening responsive to movement of said robot arm among said plurality of orientations.

18. The system of claim 17, wherein said signal generator comprises a switch that is coupled to said string and activated upon movement of said robot arm into one of said orientations where said first reference location is said fixed distance from said second reference location.

19. The system of claim 17, further comprising a reel supported on said calibration base, said reel receiving at least a portion of said string and moving responsively as said string moves responsively to movement of said robot arm among said plurality of orientations.

20. The system of claim 19, wherein said signal generator comprises a switch coupled with said reel such that movement of said reel activates said switch when said string is taut and said second reference location is substantially at said fixed distance from said first reference location.

21. The system of claim 11, wherein said controller determines each joint position of each said joint responsive to said electrical signal and uses said determined joint positions to determine a calibration factor.

22. The system of claim 11, wherein the controller uses the joint position information to determine a calibration factor that corrects errors in default joint positions.

23. A robot calibration system, comprising:
  a robot base;
  a robot arm supported on said base and including a plurality of joints that are moveable into a plurality of joint positions to provide a plurality of orientations of said robot arm;
  a controller that controls movement of said joints to move said robot arm among said plurality of orientations; and
  a calibration sensor that defines a first reference location that remains fixed relative to said robot base and generates a signal each time that a second reference location on said robot arm is a fixed distance away from said first reference location; and wherein
  said controller determines each joint position of each said joint responsive to said electrical signal and uses said determined joint positions to determine a calibration factor.

24. The system of claim 23, wherein said calibration sensor comprises a string having a first end at said first reference location and a second end at said second reference location and further comprises a switch that is activated by tension in said string that is caused by said robot arm moving into an orientation where said second reference location is said fixed distance away from said first reference location.

25. The system of claim 23, wherein said calibration sensor comprises a switch having a base portion and a contact portion that is movably supported on said base portion, said first reference location being defined at said contact portion and said second reference location being defined at a terminal location on said robot arm, and wherein said switch generates said electrical signal upon said terminal location on said robot arm contacting said contact portion in a manner that activates said switch.

26. The system of claim 25, further comprising a plurality of said switches positioned in preselected and fixed locations on a plane and wherein said controller determines a location of said plane relative to said robot base using said joint positions determined at orientations where each said switch is activated.

27. The system of claim 23, wherein the controller uses the calibration factor to correct for errors in default joint positions.

28. A method of calibrating a robot system having a robot arm that is supported on a base and includes a plurality of joints that have default positions and are moveable into a plurality of joint positions to provide a plurality of robot arm orientations, comprising the steps of:
  (A) establishing a first reference location that remains fixed relative to the robot base;
  (B) establishing a second reference location on the robot arm;
  (C) establishing a plurality of robot orientations;
  (D) establishing a starting robot orientation such that a fixed distance between the first reference location and the second reference location is achieved by moving the robot from the starting robot orientation towards one of the plurality of robot orientations;
  (E) moving the robot to the starting orientation;
  (F) moving the robot from the starting orientation towards the one of the plurality of robot orientations;
  (G) determining when the second reference location is at the fixed distance from the first reference location;
  (H) storing each joint position associated with each orientation where the second reference location is the fixed distance from the first reference location;
  (I) repeating steps D through H for each one of the plurality of robot orientations; and
  (J) determining a calibration factor by comparing the default positions with the joint positions of step H.

29. A method of providing real-time error correction to the joint positions of a robot that is moved along a programmed path between an initial orientation and destination orientation where the robot orientation is dictated by robot joint positions, comprising the steps of:
  (A) determining a calibration factor using joint position information at a plurality of robot orientations;
  (B) commanding the robot to move along the programmed path;
  (C) determining an intermediate robot orientation at a selected time interval;

(D) determining the joint positions for the intermediate robot orientation at the selected time interval;
(E) applying the calibration factor to the joint positions at the selected time interval to obtain a corrected intermediate robot orientation along the programmed path;
(F) moving the robot to the corrected intermediate orientation; and
(G) repeating steps (C) through (F) until the robot is moved into the destination orientation.

30. The method of claim 29, where the calibration factor includes a formula that is a function of one or more joint positions.

31. The method of claim 29 where the calibration factor includes a numeric table based on one or more joint positions.

* * * * *